United States Patent Office 2,786,183
Patented Mar. 19, 1957

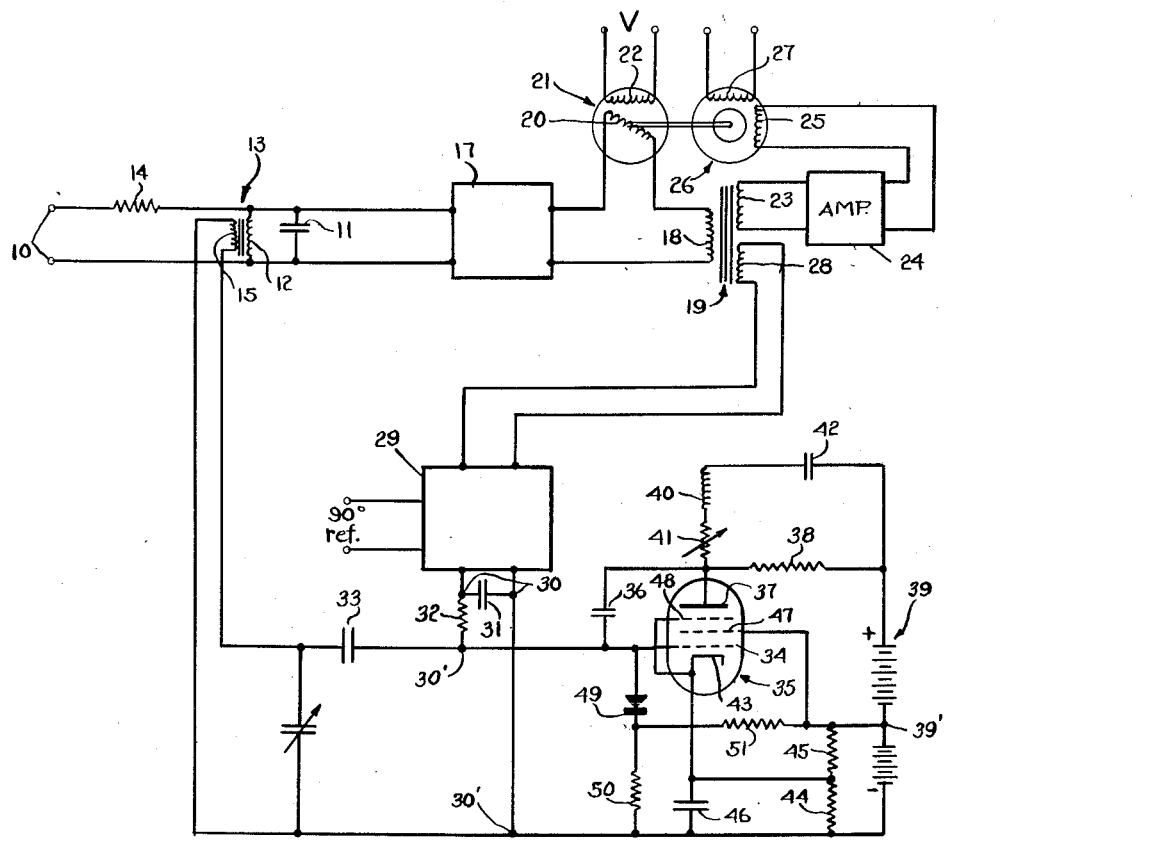

2,786,183

QUADRATURE REDUCTION CIRCUIT

Basil Jacks, East Meadow, N. Y., assignor to American Bosch Arma Corporation

Application April 14, 1953, Serial No. 348,796

4 Claims. (Cl. 333—17)

The present invention relates to electric computing devices and has particular reference to means for reducing the unwanted quadrature voltage in computing circuits.

Electric analog computers are complex devices which require precise adjustment of the circuits for successful operation, including tuning of filters in the computer chain to the frequency of the supply voltage. Since the frequency of the supply cannot be maintained exactly constant the resulting effective detuning of the filter will produce quadrature voltage which will cause sluggish operation of servo motors and inaccurate solution of problems if left uncompensated.

In order to reduce the quadrature voltage produced in this or in any other manner from the critical parts of the computer, the present invention may be used. In the preferred embodiment of this invention to be described, the computing signal voltage is applied to a filter circuit containing a parallel resonant circuit including a variable capacitance responsive to the amount of quadrature in the output of the tuned circuit. When the quadrature increases, the capacitance changes in a direction such as to reduce the quadrature output. In this invention the variable capacitance is coupled to the parallel resonant circuit by means of a transformer and is produced by the change in input capacitance of a vacuum tube which results from a change in control grid bias, such as that in the familiar Miller effect. The control bias is supplied from a rectified voltage derived from the quadrature component of the output of the tuned circuit.

Thus, since the control bias is a function of quadrature, and the input capacitance of the tube is a function of control bias, the capacitance of the filter varies with quadrature voltage and can be selected so that the change in capacitance will compensate for the change in quadrature.

The present invention can be used advantageously where it is imperative that the quadrature reduction method has negligible effect on the inphase component of the signal.

For a more complete understanding of the invention, reference may be had to the accompanying diagram in which the figure is a schematic wiring diagram of the present invention.

With reference now to the figure, a signal voltage is applied to the terminals 10 which are connected to a circuit comprising parallel connected fixed condenser 11 and primary winding 12 of transformer 13 through a resistor 14. The secondary winding 15 of transformer 13 is connected across adjustable capacitor 16 and Miller effect reactance tube 35 and reflects a capacitive impedance into the primary circuit.

The voltage across the capacitor 11 is applied to amplifier 17, the output of which is connected across the primary winding 18 of transformer 19 in series with the output of secondary winding 20 of induction potentiometer 21, the primary winding 22 of which is energized by an inphase voltage V. One secondary winding 23 of transformer 19 is connected through amplifier 24 to the control field winding 25 of a motor 26 shown in the figure as a two-phase motor the main field winding 27 of which is energized by a constant voltage in time quadrature with the control field voltage.

Motor 26 drives the secondary winding 20 of potentiometer 21 to the position where the output of potentiometer 21 matches the in-phase voltage output of amplifier 17 and the motor 26 is de-energized, since any quadrature voltage in the output of secondary winding 23 will not produce a torque output of motor 26. The remaining voltage energizing primary winding 18 is therefore only the quadrature component of the output of amplifier 17.

The other secondary winding 28 of transformer 19 is connected to the input of a phase sensitive demodulator 29 of conventional design such that the output voltage of the demodulator, available at terminals 30, is a unidirectional voltage proportional to the magnitude of the quadrature output of transformer 19. The voltage at terminals 30 is smoothed by the action of capacitors 31 and 33, resistor 32 and the internal resistance of the demodulator 19 so that a smooth D. C. voltage is applied between the terminals 30' of which one terminal is connected to grid 34 of pentode 35 and the other terminal is connected to the negative side of the power supply 39. Capacitor 33 and winding 15 are connected in series across terminals 30' so that capacitor 33 also acts as a blocking condenser to keep the D. C. from winding 15. The pentode 35 is utilized here as a Miller effect reactance tube.

In this circuit a capacitor 36 is connected between the plate 37 and grid 34 to give a substantial plate-grid capacitance $C_{gp}$, and the plate load resistor 38 is connected between the plate 37 and the positive terminal of power supply 39. Neglecting interelectrode capacities, it can be shown that the input admittance of the pentode 35 at a frequency $f$ is $$Y_g = j2\pi f C_{gp}(1-G) \tag{1}$$

where $C_{gp}$ is the value of capacitor 36 and $G$ is the amplification of pentode 35, usually a complex quantity which may be written as $A(\cos \phi + j \sin \phi)$. Substitution of $A(\cos \phi + j \sin \phi)$ for $G$ in Equation 1 gives $$Y_g = 2\pi f C_{gp} A \sin \phi + j2\pi f C_{gp}(1 - A \cos \phi) \tag{2}$$

It will be seen that (2) contains a conductive term $(2\pi F C_{gp} A \sin \phi)$ and a susceptive term $$(2\pi f C_{gp}(1 - A \cos \phi))$$

In order to eliminate the conductive term and maintain a constant transmission through the tuned filter 13, 11 as $A$ is altered, the conductive term must be reduced to zero. This is accomplished by making $\phi$ equal to 180° so that the $\sin \phi$ is zero. To this end resistor 38 is shunted by the inductance 40 of value $L$, phase adjusting resistor 41 of value $R_1$ and D. C. blocking capacitor 42, all connected in series. The plate load therefore comprises the impedance of $L_1$ and $C_{gp}$ in parallel, and if $X_{L1}$ is chosen to be approximately equal to $X_{Cgp}$ then $\phi$ is approximately 180°. $R_1$ allows fine adjustment of $\phi$.

Fixed bias for the cathode 43 is obtained from power supply 39. Resistors 44 and 45 are connected in series across a portion of power supply 39 and cathode 43 is connected to the junction of the resistors 44 and 45. A bypass capacitor 46 is connected across the resistor 44, between the negative of power supply 39 and the junction of the resistors 44, 45. The screen grid 47 is connected to the tap 39' on power supply 39, while the suppressor grid 48 is connected to the cathode 43. Cathode 43 is, of course, indirectly heated but the heater circuit is omitted from Figure 1 in the interest of simplicity. The pentode 35 may be a tube of the 6SH7 variety, for example, in which the transconductance $gm$ changes with the control grid bias, for constant values of plate and screen grid voltage, in a substantially linear fashion over a limited range of grid bias values.

The control grid bias, being the sum of the fixed bias and the voltage between terminals 30′, varies in accordance with the magnitude of the quadrature voltage in the secondary winding 28 about a quiescent value of the fixed bias. Thus, the transconductance of the tube 35 varies about a quiescent value, and the amplification A of the tube, being proportional to the transconductance also varies with the magnitude of the quadrature voltage in secondary winding 28. It will be seen therefore, that the input susceptance and therefore the input capacitance of the pentode 35 varies in accordance with the quadrature voltage in winding 28, as indicated by Equation 2.

The capacitance seen by the secondary winding 15 is substantially the sum of the capacitance of capacitor 16 and the input capacitance of tube 35, and this capacitance is coupled into the L-C circuit of capacitor 11 and transformer 13 by means of transformer 13. The capacitor 16 is adjusted until the L-C circuit is tuned to resonance with the frequency of the signal input while tube 35 is in the quiescent state.

A signal applied to terminals 10 is transmitted through the filter comprising resistor 14, transformer 13 and capacitor 11 to the amplifier 17. If the L-C circuit 13, 11 is tuned to the frequency of the input signal frequency, there will be no phase shift between the signal at terminals 10 and amplifier 17. If there is a change of frequency in the signal supply it is well known that there will be an attendant phase shift in the L-C circuit and a quadrature component will be developed. This quadrature voltage will cause the capacitance in the L-C circuit to be changed by the reactance tube 35 to thereby detune the filter to approximate resonance with the frequency of the signal voltage, and thereby reduce the production of quadrature voltage. A balance is reached when the quadrature in the output is just sufficient to maintain the detuning of the L-C circuit at the proper value to produce that amount of quadrature in the output. The quadrature is therefore not reduced to zero, but the gain in the system is sufficiently large to effect a very considerable reduction in the quadrature voltage.

It will be seen that at the same time however the ratio of input inphase voltage to output inphase voltage is substantially constant since the magnitude of the tuned circuit impedance is nearly constant at frequencies near the resonant frequency.

If a quadrature voltage exists in the input signal at terminals 10, the output quadrature voltage will be reduced in a similar manner by detuning the L-C circuit with respect to the frequency of the signal voltage.

In order to limit the positive grid excursion, a biased germanium crystal 49 is connected across terminals 30′ thereby shunting the grid 34. The resistors 50 and 51 connected across a portion of power supply 39 supply the biasing voltage across resistor 50.

I claim:

1. In a device of the character described, a filter, a reference voltage, said filter having an input and an output, the output voltage of said filter being normally composed of an inphase component and a quadrature component ninety degrees out of phase with each other, said inphase component being substantially in quadrature with said reference voltage and said quadrature component being substantially inphase with said reference voltage, said filter also including a transformer having a primary winding connected across said output, a capacitance, said transformer having a secondary winding connected across said capacitance, an amplifier having an input connected across said transformer primary winding and an output normally containing a quadrature voltage component which is substantially inphase with said reference voltage, a vacuum tube having a cathode, anode and at least one grid, a fixed bias between said grid and said cathode, detecting means producing a unidirectional voltage proportional to the magnitude of the quadrature voltage in the output of said amplifier and connected in series with said fixed bias to vary the bias voltage between said grid and said cathode and a connection between said grid and the secondary winding of said transformer whereby the quadrature output of said filter is reduced.

2. The device of claim 1 in which the detecting means is a phase sensitive rectifying means.

3. In a device of the character described, a filter, a reference voltage, said filter having an input and an output, the output voltage of said filter being normally composed of an inphase component and a quadrature component ninety degrees out of phase with each other, said inphase component being substantially in quadrature with said reference voltage and said quadrature component being substantially inphase with said reference voltage, said filter also including a transformer having a primary winding connected across said output, a capacitance, said transformer having a secondary winding connected across said capacitance, an amplifier having an input connected across said transformer primary winding and an output normally containing a quadrature voltage component which is substantially inphase with said reference voltage, a vacuum tube having a cathode, anode and at least one grid, a fixed bias between said grid and said cathode, a capacitor connected between said grid and said anode, an inductance connected between said anode and said cathode and having an impedance equal to the impedance of said capacitor at a predetermined frequency, detecting means producing a unidirectional voltage proportional to the magnitude of the quadrature voltage in the output of said amplifier and connected in series with said fixed bias to vary the bias voltage between said grid and said cathode and a connection between said grid and the secondary winding of said transformer whereby the quadrature output of said filter is reduced.

4. The device of claim 3 in which the detecting means is a phase sensitive rectifying means.

References Cited in the file of this patent

UNITED STATES PATENTS

| | | |
|---|---|---|
| 2,017,270 | Yolles | Oct. 15, 1935 |
| 2,170,475 | Hahn | Aug. 22, 1939 |
| 2,231,372 | Rothe et al. | Feb. 11, 1941 |
| 2,255,050 | Farrington | Sept. 9, 1941 |
| 2,293,274 | Barber | Aug. 18, 1942 |
| 2,457,034 | Curtis | Dec. 21, 1948 |